Oct. 26, 1965          R. S. DE BRY          3,214,676
VOLTAGE REGULATING TRANSISTOR CIRCUIT EMPLOYING
MAGNETIC SENSING MEANS
Filed June 19, 1961

INVENTOR.
RONALD S. DeBRY

BY

ATTORNEY 3,214,676
VOLTAGE REGULATING TRANSISTOR CIRCUIT EMPLOYING MAGNETIC SENSING MEANS
Ronald S. De Bry, Santa Clara, Calif., assignor to Varian Associates, Palo Alto, Calif., a corporation of California
Filed June 19, 1961, Ser. No. 118,120
14 Claims. (Cl. 323—22)

The present invention relates in general to power supply regulation and control and, in particular, to a novel magnetic current sensing device and magnetic modulator that can be used to regulate the current while dissipating only small amounts of power of the regulating current.

The sensing device of the present invention has advantages over sensing devices of power supply regulators which have been used in the past. For example, in power supplies previously used to provide, for example, 5,000 watts to an electromagnet, the sensing element for detecting an error voltage, generally a resistor, dissipates large amounts of power. If the power supply becomes very large, for example, in the order of 40 kilowatts, the use of a sufficiently large resistor as the sensing element to give accurate regulation becomes prohibitive, as the amount of power dissipated thereby creates very large amounts of heat. If a smaller resistor were used, for example, smaller by a factor of 10, the regulation would be also lowered by a factor of 10, making the regulator unsuitable for sensitive regulation.

The present magnetic current sensing device may be used in a power supply for a low impedance magnet system which uses up to 40,000 watts at 200 amps. This device will sense this current to a high degree of accuracy and stability and provide in the event of a current fluctuation, a modulated electrical output that can be used to regulate the current while dissipating only small amounts of power of the regulated current.

The object of the present invention is to provide a simple technique of regulating the current output of a power supply at a known adjustable level and to control the amplitude of the current over the entire power range.

The main feature of the present invention is the provision of a sensor which senses changes in the amplitude of the current and a magnetic modulator which regulates the current by comparing the sensed current with a current standard.

Another feature of the present invention is the provision of a degaussing technique for the magnetic modulator to prevent drifting of the desired current standard level.

Figure 3:
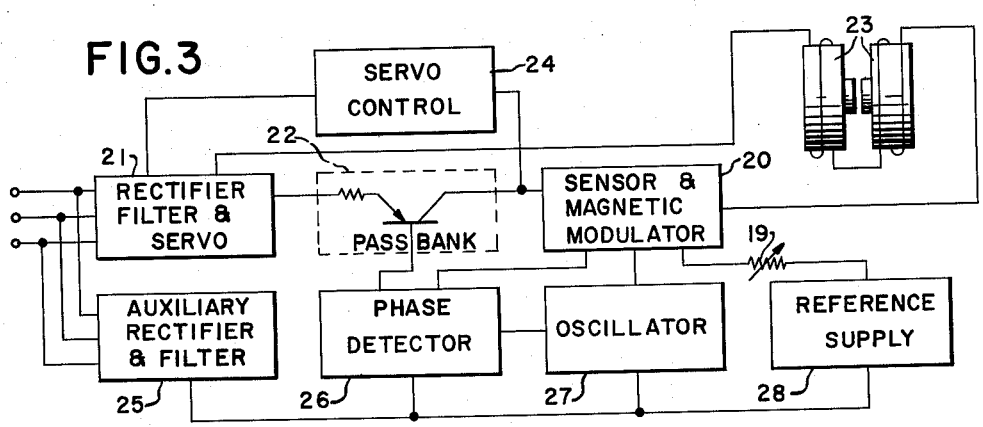
Figure 2:
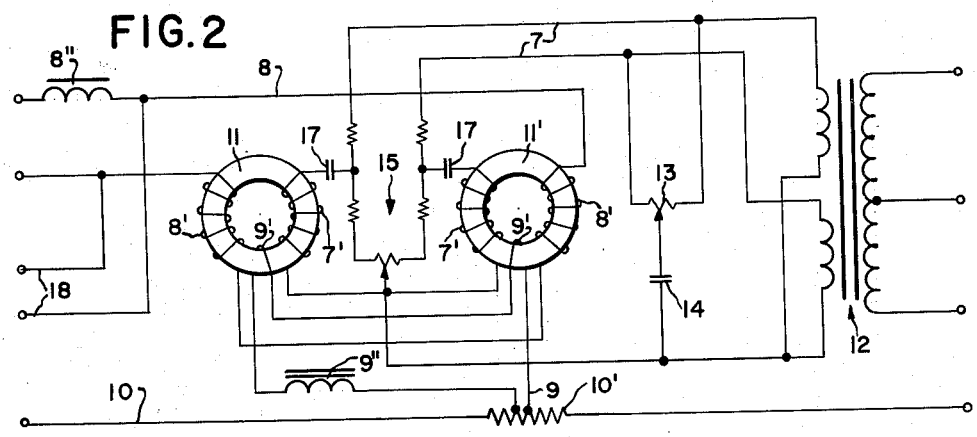
Figure 1:
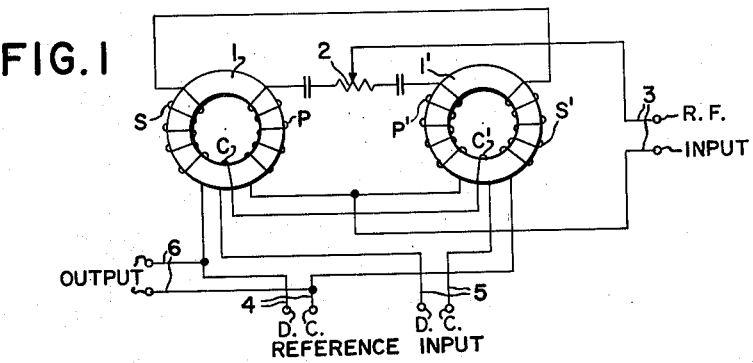

These and other features of the present invention will become apparent upon a perusal of the following specification and drawings wherein, FIG. 1 is a schematic drawing of a magnetic modulator useful in explaining the theory of operation of the present invention, FIG. 2 is a schematic drawing showing the sensing element and the magnetic modulator of the present invention and their associated circuits, and FIG. 3 shows a power supply for a magnet in block diagram form incorporating the novel sensor and magnetic modulator used for current regulation.

In FIG. 1 there is shown a magnetic modulator in accordance with the present invention comprising two magnetic cores 1 and 1' of, for example, supermalloy. Cores 1 and 1' each have three windings P, P'; S, S'; and C, C', connected thereto. The cores 1 and 1' are driven into saturation by a current, balanced by resistor 2. The current is supplied by an R.F. oscillator (for example, 20 kc.) connected through input 3 to the primary windings P and P' of the cores. The secondary core windings S and S' are connected in a series opposing fashion with respect to the primary windings, so that the voltage appearing across the secondary winding of each core is opposite from the voltage of the other. Control windings C and C' are shown connected to a control input 5. If a D.C. reference current $I_s$ from an input 4 is applied to windings of the cores which creates a D.C. magnetic field which is equal to a D.C. magnetic field applied by a current source $I_c$ to the control or third windings C and C' from input 5, there will be zero output (I out) from the modulator because the D.C. fields from the currents in the windings are equal and opposing in polarity. When the D.C. field applied to the cores by control windings C and C' is greater or less than the D.C. reference field applied by windings S and S', a resulting field which is proportional to the difference between the two fields will be present. This difference field can be evidenced by a signal which will be the secondary harmonic (E out), of the driving oscillator. This signal can be removed by a separate winding or by any of the D.C. field windings present. In our example, the second harmonic signal is removed by the secondary windings S and S'. The phase of the second harmonic is controlled by the direction of the D.C. control with respect to the D.C. reference on the cores, and in the example given above, this phase will be negative as the control current is less than the reference current.

The magnetic modulator described above is subject to several sources of zero error. The zero condition occurs when the D.C. fields are equal and opposite. Among the sources of error, are memory defects due to the hysteresis effect and remanence resulting from an excessive error signal. These effects can be minimized by the use of an oscillator that will drive the cores 1 and 1' far into saturation on each half cycle of the oscillator drive. The oscillator drive must be sufficient to degauss the cores even under the most severe D.C. signal that can be applied to the cores of the magnetic modulator, which, when used in the regulating system of the present invention, occurs when the full reference current is applied to the cores without the control or magnet current being applied, or when the reference current is removed from the cores with the maximum magnet current being applied. In one embodiment, the reference current and control current serve to develop about 10 ampere turns at maximum power.

The operating point of the cores has been set, for example, at 10 ampere turns of D.C. signal. It has been determined that 10 ampere turns developed by drive current from the oscillator are sufficient to degauss the cores. An additional 20 ampere turns are utilized in the present embodiment to maintain a useful A.C. signal above the D.C. bias level of 10 ampere turns.

Referring now to FIG. 2, there is shown in detail the sensing device and magnetic modulator utilized to regulate current in the present invention. A pair of magnetic cores 11 and 11' of, for example, supermalloy, are driven into saturation by current from an oscillator 27 (see FIG. 3) having, for example, a 20 kc. output. Saturation current is coupled to core primary windings 7' by leads 7 connected to the secondary windings of a transformer 12. A capacitive balance, comprising resistor 13 and capacitor 14, is connected across the leads 7 between the cores 11 and 11' and transformer 12 to prevent phase shift between the 20 kc. signal applied to the cores. The currents in the core windings 7' are balanced by a resistive balance 15, comprising a plurality of resistors in series. A pair of capacitors 17 are provided between resistive balance 15 and primary windings 7' to block D.C. from the 20 kc. signal source and leads 7. It is noted that the secondary of transformer 12 is actually a pair of secondary windings connected in parallel to further insure A.C. current balance to the cores.

The power supply current is regulated in conformance with the description of FIG. 1. A shunt 10' coupled to a high current line 10 (for example, 200 amperes) is set so that ten amperes are applied through a load 9 to each of the cores 11 and 11' through windings 9'. A choke 9" is provided in lead 9 to block any A.C. signal from the 200 ampere line 10. A D.C. reference field is applied to the secondary windings 8' of cores 1' by current from a reference current supply 28 (FIG. 3) via leads 8. A choke 8" is provided to block A.C. signal from the reference current source. The turns ratio of the windings in each core is as follows: 30 ampere turns in primary windings 7' from the 20 kc. oscillator—for example, three amperes of current going through ten turns in each core; 10 ampere turns in secondary windings 8' from the reference supply—for example, 0.1 ampere of current through 100 turns in each core; and 10 ampere turns in windings 9' from the power supply—for example, 10 amperes of current through one turn in each core. It is noted that the turns ratio and amount of current supplied to each winding are illustrative only and are in no way meant to be limiting. If there is a fluctuation in the power supply current, for example, to a lower level of current, the 10 amperes of current tapped through lead 9 to windings 9' would decrease proportionally, unbalancing the D.C. magnetic fields in the two cores, because the reference supply will remain a constant 10 ampere turns. This downward fluctuation of current would lower the D.C. field level of the control windings 9', thereby producing a resulting second harmonic or 40 kc. output signal which may be removed by secondary windings 8'. This 40 kc. signal output is produced in conformance with the magnetic modulation operation explained above. The phase of the 40 kc. output would be determined by the direction of the current fluctuation, which is negative in this instance. This modulated 40 kc. output signal would be connected, via output 18, to a phase detector circuit. If the current in line 10 was to fluctuate upward, the D.C. magnetic field level would rise in the control winding 9' of the cores, thereby causing a 40 kc. signal of positive phase to be fed to the phase detector. The amplitude of the 40 kc. output would be proportional to the amount of deviation from the reference current.

Referring now to FIG. 3, there is shown in block diagram form a power supply for a high powered magnet utilizing the sensing device and magnetic modulation of the present invention. It is noted that this amount of regulated current is needed in supplying large magnets useful in nuclear magnetic resonance devices where a large, homogeneous magnetic field is needed. A three-phase input of, for example, 480 volts, is supplied to a rectifier, filter and servo unit 21 where the voltage is rectified and filtered in a known manner. The rectifier and filter 21 supplies a 200 amp. 200 volt output which is fed through a transistor pass bank 22 of, for example, 88 transistors connected in parallel. It is in this transistor pass bank 22 where the current is regulated. The output from the transistor pass bank 22 is supplied to the windings of, for example, a magnet 23. A servo control 24 is connected across the transistor pass bank 22 to control a variable transformer servo to maintain a constant voltage across the transistors despite any fluctuations in current, as set forth in copending application S.N. 187,362, filed April 13, 1962, and assigned to the same assignee.

A tap off the power supply input is fed into an auxiliary rectifier and filter 25 which provides regulated power to a phase detector 26, an oscillator 27, and a reference current supply 28. The magnetic modulator or sensing device 20 samples the current output of the transistor pass bank 22, as described above. A 40 kc. output signal from the magnetic modulator is supplied to the phase detector 26 when there is any deviation in the current flow. The 40 kc. output signal from the magnetic modulator 20 is phase detected, by comparing it with the phase of a 40 kc. output from the oscillator 27. The difference in phase between the two 40 kc. signals determine the polarity of the signal which will bias the base element of each transistor of the transistor pass bank 22 to pass more or less current through the transistors, as the case may be. A manual control 19, for example, a rheostat, is provided to permit control of the reference current supply 28 to the magnetic modulator thereby providing regulation of the power supply to the magnet from anywhere from approximately 0 to 40,000 watts. For example, if the reference current was set at 0.05 ampere, the line current through the pass bank would be lowered to 100 amperes to balance the modulator 20.

Another advantage in using a 20 kc. carrier for the magnetic modulator is that the band pass will be about 2 kc. This eliminates the need of a D.C. amplifier which would be needed if a standard 60 cycle carrier was used.

What has been shown is a second harmonic type of magnetic modulator (sometimes termed a magnetic chopper) which has been utilized with a simple lead as a sensing device to sense any deviation from a current source of large magnitude. This is done without large amounts of power being dissipated in a sensing resistor used in the common type of regulator. A device as shown and described above will have a short term stability (a few minutes) in the order of one part per million and a medium term stability (a few hours) in the order of one part per hundred thousand.

While there have been described and illustrated specific embodiments of the present invention it will be obvious that various changes and modifications may be made therein without departing from the scope of the invention which should be limited only by the scope of the appended claims.

What is claimed is:

1. Apparatus for regulating a power supply including; a pair of magnetic core members, said core members each having primary and secondary electrical windings coupled thereto, means connected to said primary windings for supplying A.C. magnetic fields to said cores; said secondary windings being wound in a series opposing manner with respect to said primary windings; means for supplying a reference D.C. magnetic field in each of said cores; means for supplying a D.C. control magnetic field to said cores, said D.C. control magnetic field being proportional to the current output of said power supply; and output means for said cores for supplying an output signal to said power supply to regulate said power supply when the current output from said power supply produces a magnetic field within said cores which deviates from the magnetic field within said cores supplied by said reference source.

2. The apparatus according to claim 1 where said means for supplying an A.C. magnetic field includes an oscillator, said oscillator supplying an A.C. field of sufficient magnitude to degauss the cores thereby preventing shifts of the current standard level within the cores due to the hysteresis effect.

3. The apparatus according to claim 2 wherein the A.C. magnetic field coupled to said magnetic cores is of equal or greater magnitude than the D.C. magnetic fields coupled to said cores.

4. The apparatus according to claim 2 where the means connected to said primary windings include a capacitive balance to prevent phase shift between the A.C. field present in said cores.

5. The apparatus according to claim 4 where the means connected to said primary windings include a resistive balance to insure equal A.C. field magnitudes in each core.

6. In an apparatus for regulating a power supply including; a power source; a transistor pass bank for passing the current output of said power source, said transistor pass bank including means for controlling the amount of current flow therethrough; load means for receiving the output current of said pass bank; means for sampling the output current of said pass bank, magnetic core members for receiving the sampled output current, said magnetic core members each having primary and secondary electrical windings coupled thereto, means connected to said primary windings for supplying A.C. magnetic fields to said core members, said secondary windings being wound in a series opposing manner with respect to said primary windings, means connected to said secondary windings for coupling a reference D.C. magnetic field to said core members, control windings for coupling said sample current to said core members, said control windings coupling a control D.C. magnetic field to said magnetic core members proportional to the sample output current, and output means for supplying an output signal from said core members when the control magnetic field deviates from said reference magnetic field and means for connecting said output signal to said pass bank for regulating the current passing therethrough thereby regulating said power supply.

7. The apparatus according to claim 6 wherein said transistor pass bank includes a plurality of transistors connected in parallel.

8. The apparatus according to claim 6 wherein said means for supplying an A.C. magnetic field to said cores includes an oscillator, said oscillator supplying an A.C. field of sufficient magnitude to degauss the cores thereby preventing shifts of the current standard level within said cores.

9. The apparatus according to claim 6 wherein the means connected to said primary windings include a capacitive balance to prevent phase shift between the A.C. field present in said cores.

10. The apparatus according to claim 6 wherein the means connected to said primary windings include a resistive balance to insure equal A.C. field magnitudes in each core.

11. The apparatus according to claim 6 wherein said output signal from said core members is supplied to a phase discriminator, said phase discriminator including means for comparing the phase of said output signal with a signal from said means supplying A.C. magnetic fields to said cores, said phase discriminator coupling a signal to said pass bank to control the current flow therethrough.

12. The apparatus according to claim 6 wherein the A.C. magnetic field coupled to said magnetic cores is of equal or greater magnitude than the D.C. magnetic fields applied to said cores.

13. The apparatus according to claim 6 wherein said power source has a current output in excess of 100 amperes.

14. The apparatus according to claim 1 including a phase sensitive detector responsive to an output signal at the second harmonic of the frequency of said primary A.C. magnetic field, said phase detector establishing an output signal for controlling the current output of said power supply.

References Cited by the Examiner

UNITED STATES PATENTS

| | | | |
|---|---|---|---|
| 2,395,389 | 2/46 | Huge | 321—68 X |
| 2,643,360 | 6/53 | Fairstein | 323—4 X |
| 2,882,352 | 11/54 | Rote | 323—56 X |
| 2,764,725 | 9/56 | Buie | 323—56 X |
| 2,834,934 | 5/58 | Koppel | 323—56 |
| 2,892,155 | 6/59 | Radus | 321—25 X |
| 3,012,187 | 12/61 | Johnson | 323—56 |
| 3,015,073 | 12/61 | Mamon | 323—56 X |
| 3,135,911 | 6/64 | Van Allen | 323—56 X |

OTHER REFERENCES

Gegger: "Magnetic Amplifier Circuits," chapter 16, "Second-Harmonic-Type Magnetic Amplifier Circuits," pages 219–232, McGraw-Hill Book Co., Inc., publ. January 29, 1954.

LLOYD McCOLLUM, *Primary Examiner*.